(12) United States Patent
Hsu

(10) Patent No.: US 8,345,328 B2
(45) Date of Patent: Jan. 1, 2013

(54) SCANNER WITH AUTO DOCUMENT FEEDER

(75) Inventor: Wei-Hsun Hsu, Taipei (TW)

(73) Assignee: Primax Electronics Ltd., Neihu (TW)

( * ) Notice: Subject to any disclaimer, the term of this patent is extended or adjusted under 35 U.S.C. 154(b) by 368 days.

(21) Appl. No.: 12/824,621

(22) Filed: Jun. 28, 2010

(65) Prior Publication Data

US 2011/0279875 A1 Nov. 17, 2011

(30) Foreign Application Priority Data

May 14, 2010 (TW) ................ 99115440 A

(51) Int. Cl.
*H04N 1/04* (2006.01)
(52) U.S. Cl. ......... 358/498; 358/474; 358/497; 358/496
(58) Field of Classification Search .................. 358/498, 358/474, 497, 496
See application file for complete search history.

(56) References Cited

U.S. PATENT DOCUMENTS

| 6,163,927 | A  | * | 12/2000 | Leu | ............... | 16/272 |
| 7,225,506 | B2 | * | 6/2007 | Tiao | ............... | 16/374 |
| 8,208,180 | B2 | * | 6/2012 | Osakabe et al. | ............... | 358/474 |

* cited by examiner

*Primary Examiner* — Houshang Safaipour
(74) *Attorney, Agent, or Firm* — Apex Juris, pllc; Tracy M. Heims

(57) ABSTRACT

The present invention relates to a scanner with auto document feeder including a housing, an auto document feeder and a connecting mechanism for connecting the housing and the auto document feeder. The connecting mechanism includes a first connecting structure and a second connecting structure. The first connecting structure let the auto document feeder rotates with respect to the housing to a first angle and the second connecting structure let the auto document feeder rotates with respect to the housing to a second angle. The second connecting structure makes the auto document feeder stop at any angle within the second angle.

5 Claims, 12 Drawing Sheets

SCANNER WITH AUTO DOCUMENT FEEDER

FIELD OF THE INVENTION

The present invention relates to a scanner, especially to a scanner with an auto document feeding mechanism.

BACKGROUND OF THE INVENTION

Scanner is a popular office machine used widely for image capture application. To increase document feeding speed, a scanner equipped with an auto document feeding mechanism is therefore developed. However, when user operates a conventional flatbed scanner to scan a book, an upper cover of the scanner has to be manually lifted up for scanning operation.

FIG. 1A is a prior art scanner disclosed in the U.S. Pat. No. 7,619,789. The scanner shown in FIG. 1A includes an upper cover 1, a housing 2 and a connecting mechanism 3, in which, the connecting mechanism 3 further includes a first axle 31, a second axle 32 and a pivoting plate 33.

The connecting mechanism 3 is used to connect the upper cover 1 and the housing 2, to rotate the upper cover 1 with respect to the housing 2. In FIG. 1A, the first axle 31 connecting pivotally the upper cover 1 to the pivoting plate 33, rotates the upper cover 1 with respect to the housing 2 to about 40 arc degrees. At the moment, the second axle 32 is disposed in the axle center A1, and the pivoting plate 33 is not with respect rotated with respect to the housing 2.

Please refer to FIGS. 1B and 1C, the second axle 32 connecting pivotally the pivoting plate 33 to the housing 2, in case of scanning a book or a big size document, the upper cover 1 and the pivoting plate 33 can be lifted up to shift the second axle 32 into the axle center A2, to enable the upper cover 1 and the pivoting plate 33 to rotate with respect to the housing 2 to more than 180 arc degrees.

To the aforementioned upper cover opening mechanism of the prior art scanner, there are some drawbacks needed to be improved. First, the mentioned scanner of the prior art is inapplicable to a scanner with an auto document feeder. That is because the upper cover of the scanner with the auto document feeder is quite massive and hard to a general user to lift up the upper cover 1 to change its axle center location. In addition, the axle used for the scanner of the prior art is unbearable to the weight of the upper cover equipped with the auto document feeder and thereby affecting the useful life of life-span of the axle.

Second, even though it is not applied to the scanner with the auto document feeder, the prior scanner has several drawbacks when scanning a book or a larger size document, as described as follows. Please refer to FIG. 1D, take scanning the two adjacent pages B1 and B2 as an instance. FIG. 1D shows a situation of scanning page B1. After the page B1 has been scanned, it has to move B1 toward the upper cover 1 in order to successively put the page B2 onto the flatbed of the scanner for scan, that is, user needs to lift the upper cover up to a larger angle to accommodate the page B1 of the book B. However, if there is a room limitation or an obstacle adjacent to the scanner, the turning operation of the upper cover is unavoidable interfered and hard to turn directly to over 180 arc angles to accommodate B1. Then a compromised orientation change of 180 degrees for B2 scanning is unavoidable, and an undesired 180 degrees difference of the scanned images for B1 to B2 is induced. To align the images orientation of B1 to B2, a further image adjusting operation is necessarily, however that is extra and inconvenient operation to user.

SUMMARY OF THE INVENTION

The purpose of the present invention is to provide a scanner with an auto document feeder, a connecting mechanism is thus provided to connect the auto document feeder to a housing to enable the auto document feeder not only to rotate with respect to the housing to a first and a second angle, but also stop at any angular position within the second angle.

In a preferred embodiment, the scanner with an auto document feeding mechanism of the present invention, includes a housing having a scan platform thereupon, an auto document feeding mechanism for feeding document, a connecting mechanism connecting the housing with the auto document feeding mechanism to enable the auto document feeding mechanism to rotate with respect to the housing, in which, the connecting mechanism includes a first connecting device connecting pivotally to the housing to enable the auto document feeding mechanism to rotate with respect to the housing to a first angle, and a second connecting device disposed between the first connecting device and the auto document feeding mechanism to enable the auto document feeding mechanism not only to rotate with respect to the housing to a second angle, but also stop at any angular position within the second angle, the second connecting device including a first pivot piece fixed on the first connecting device, and two parallel wing pieces disposed on the first pivot piece, each of the wing pieces having an axle hole, an axle passing through the two axle holes of the two parallel wing pieces, a second pivot piece with two ends, in which, one end is disposed on the axle, and the other end is fixed on the auto document feeding mechanism, further two fixed elements are disposed on the two ends of the axle, respectively, and four metal wearing pieces are disposed between the fixed element and the wing piece, and between one end of the second pivot piece and the wing piece, respectively, to provide a friction to enable the auto document feeding mechanism to stop at any angular position within the second angle.

In another preferred embodiment, the first connecting device includes a supporting portion connecting to the housing, and a rotation portion connecting pivotally to the supporting portion, in which the first pivot piece is fixed on the rotation portion.

In another preferred embodiment, the two wing pieces are perpendicular to the first pivot piece.

In another preferred embodiment, the first pivot piece and the second pivot piece are made of metal.

In another preferred embodiment, the second angle is larger than the first angle, however, less than 180 arc degrees.

DETAILED DESCRIPTION OF THE PREFERRED EMBODIMENT

One preferred embodiment of the present invention is a scanner with an auto document feeder, and applicable to a multi-function business machine and an auto document feeding scanner.

Figure 1A:
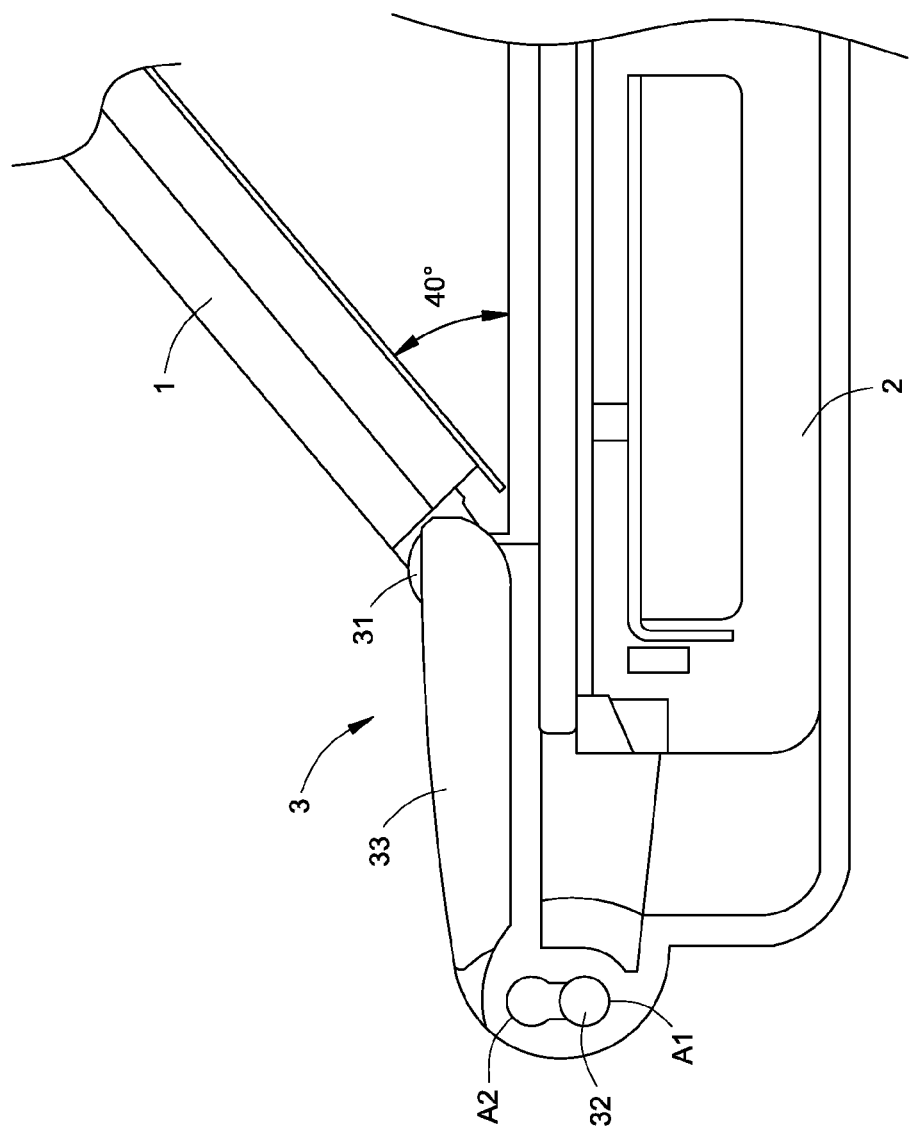
FIGS. 1A-1D are the cross-section views depicting the rotation of the upper cover relative to the housing of the conventional scanner.
Figure 1B:
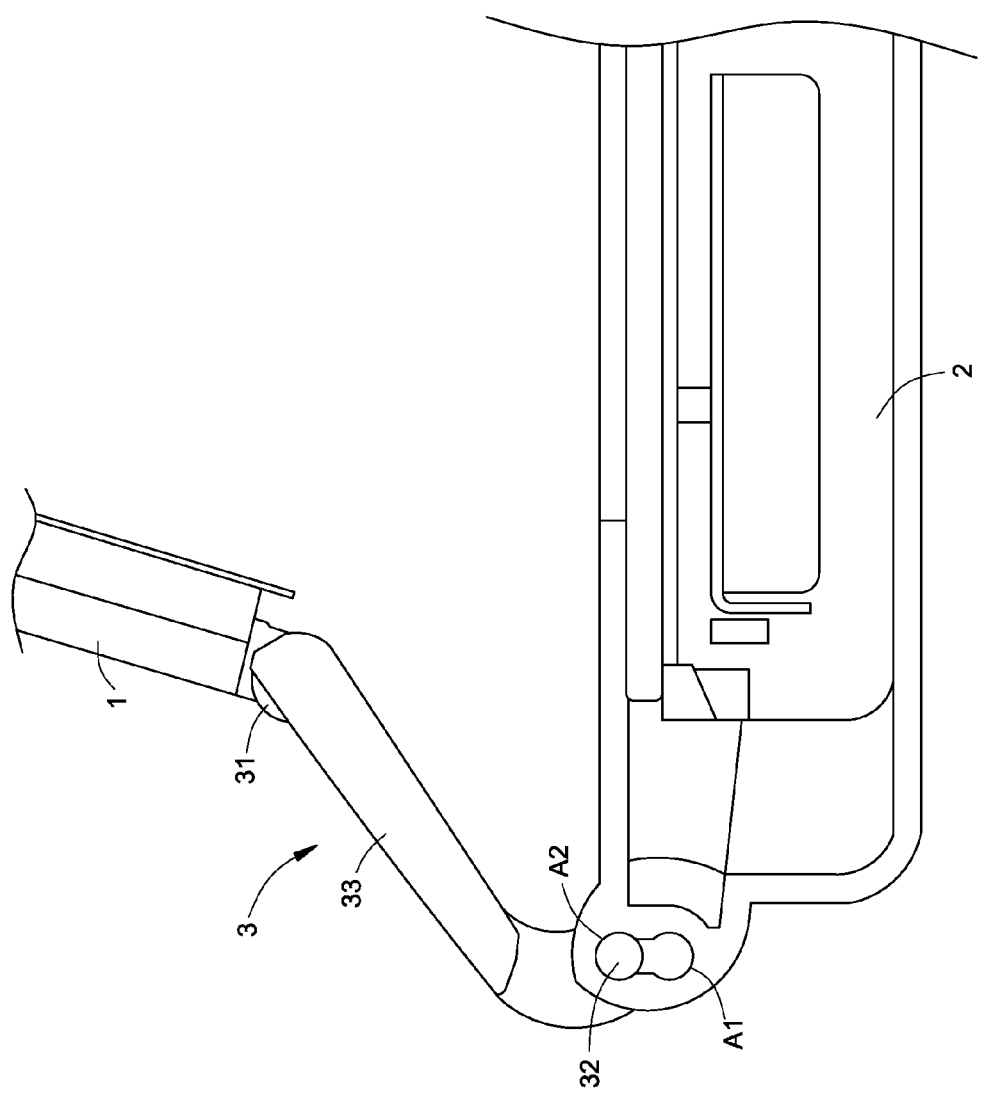
Figure 1C:
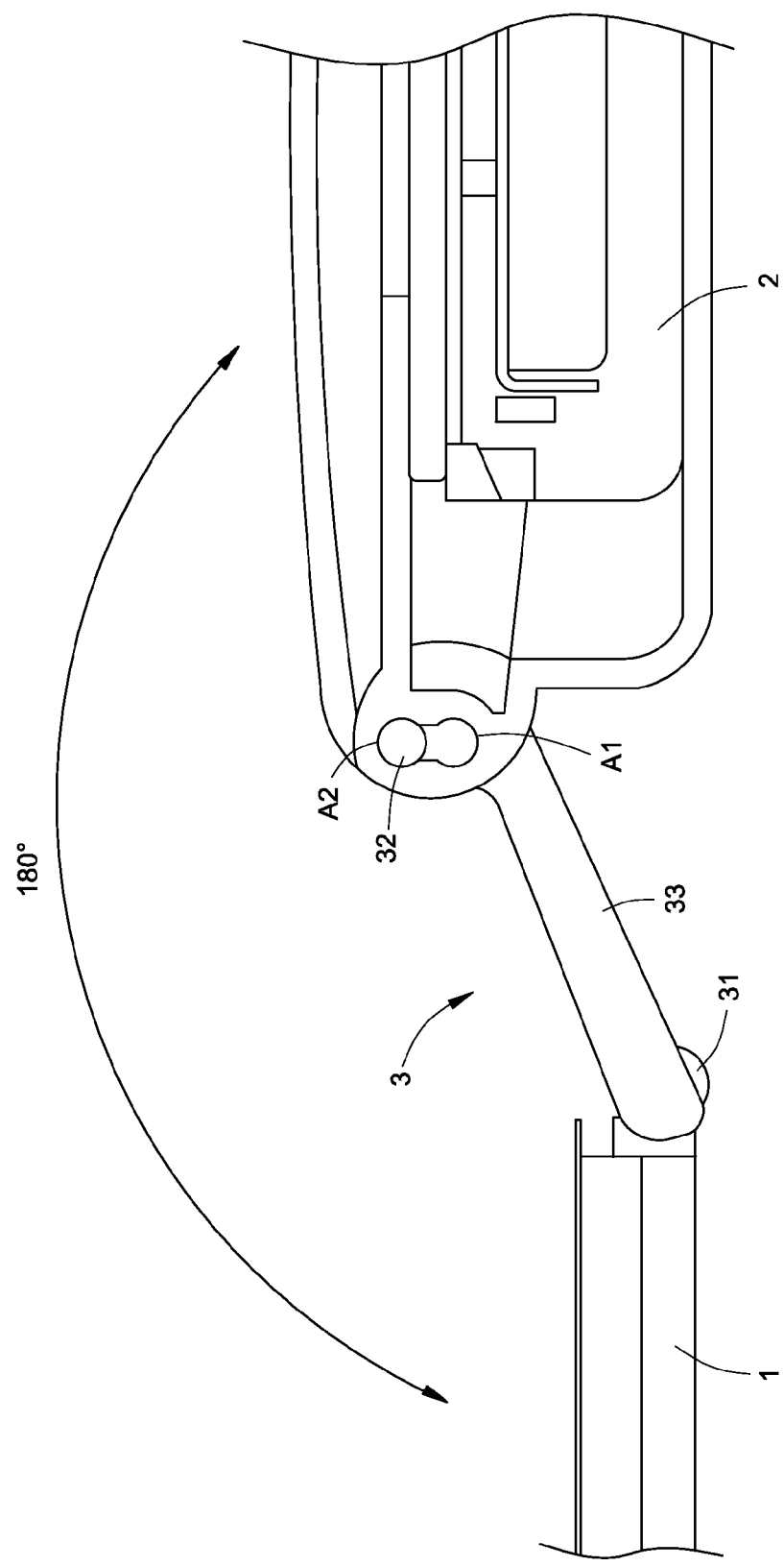
Figure 1D:
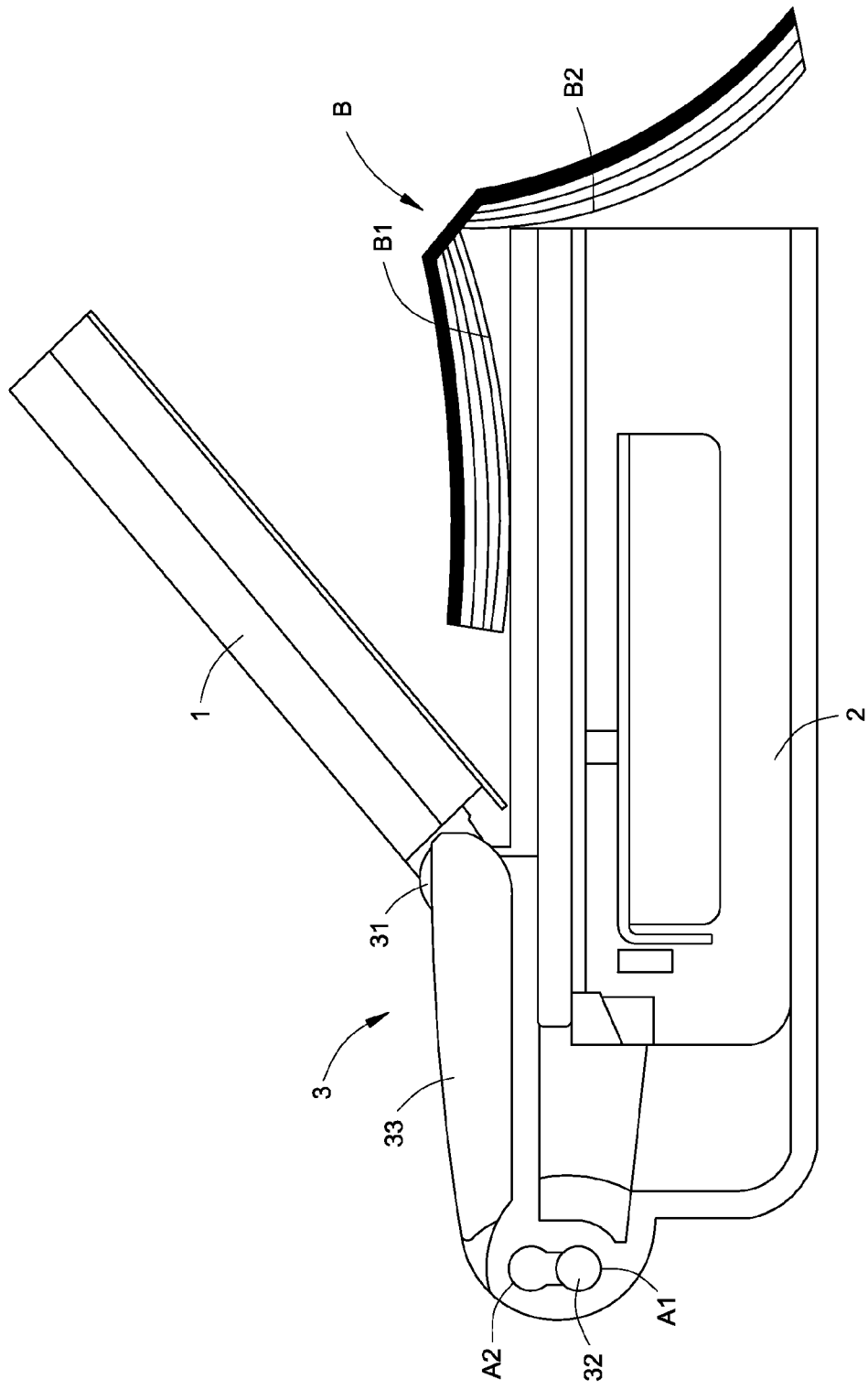
Figure 2:
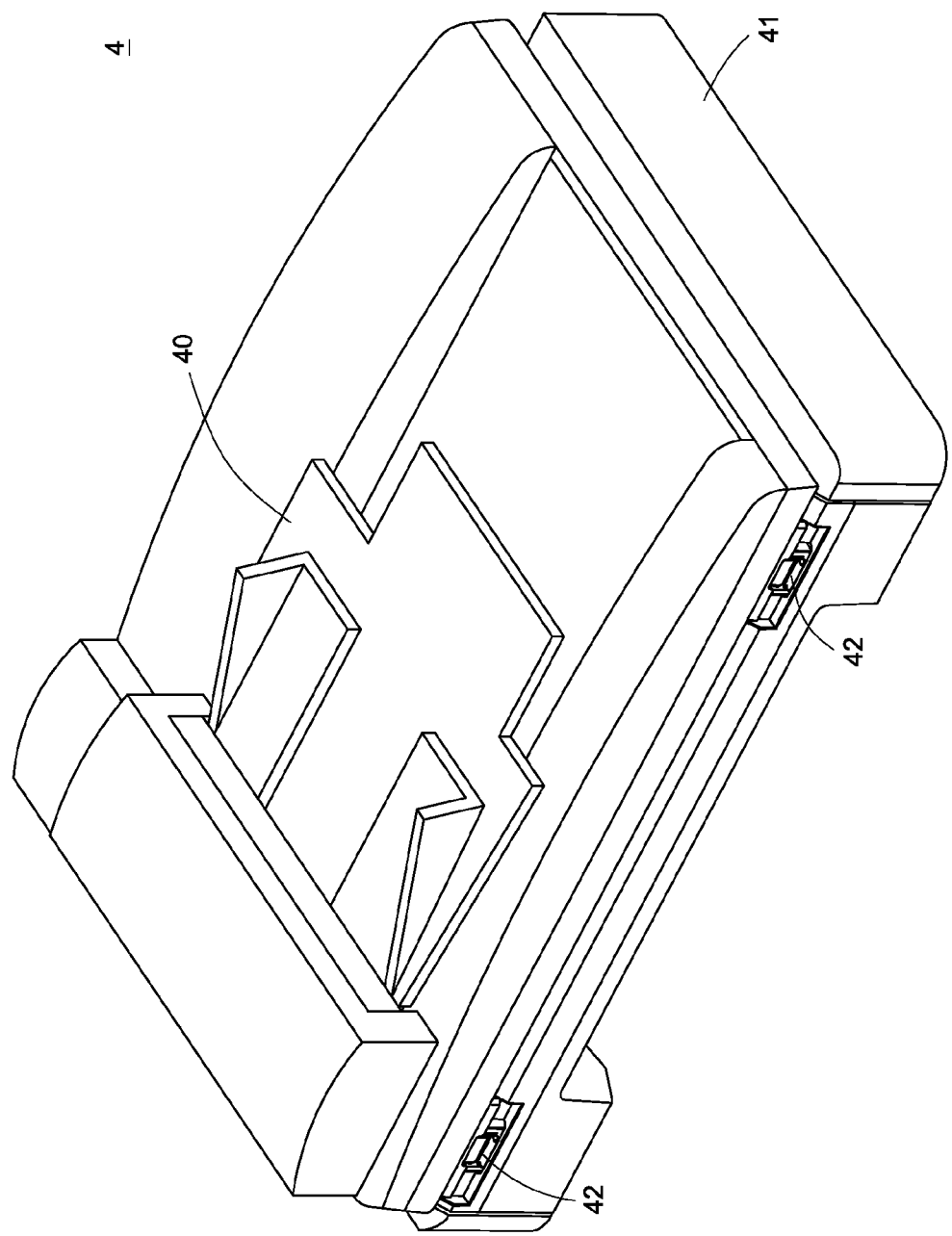
FIG. 2 is a perspective view showing a first preferred embodiment of the scanner of the present invention with an auto document feeder, and there is no relative rotation between the feeder and the housing.
Figure 3:
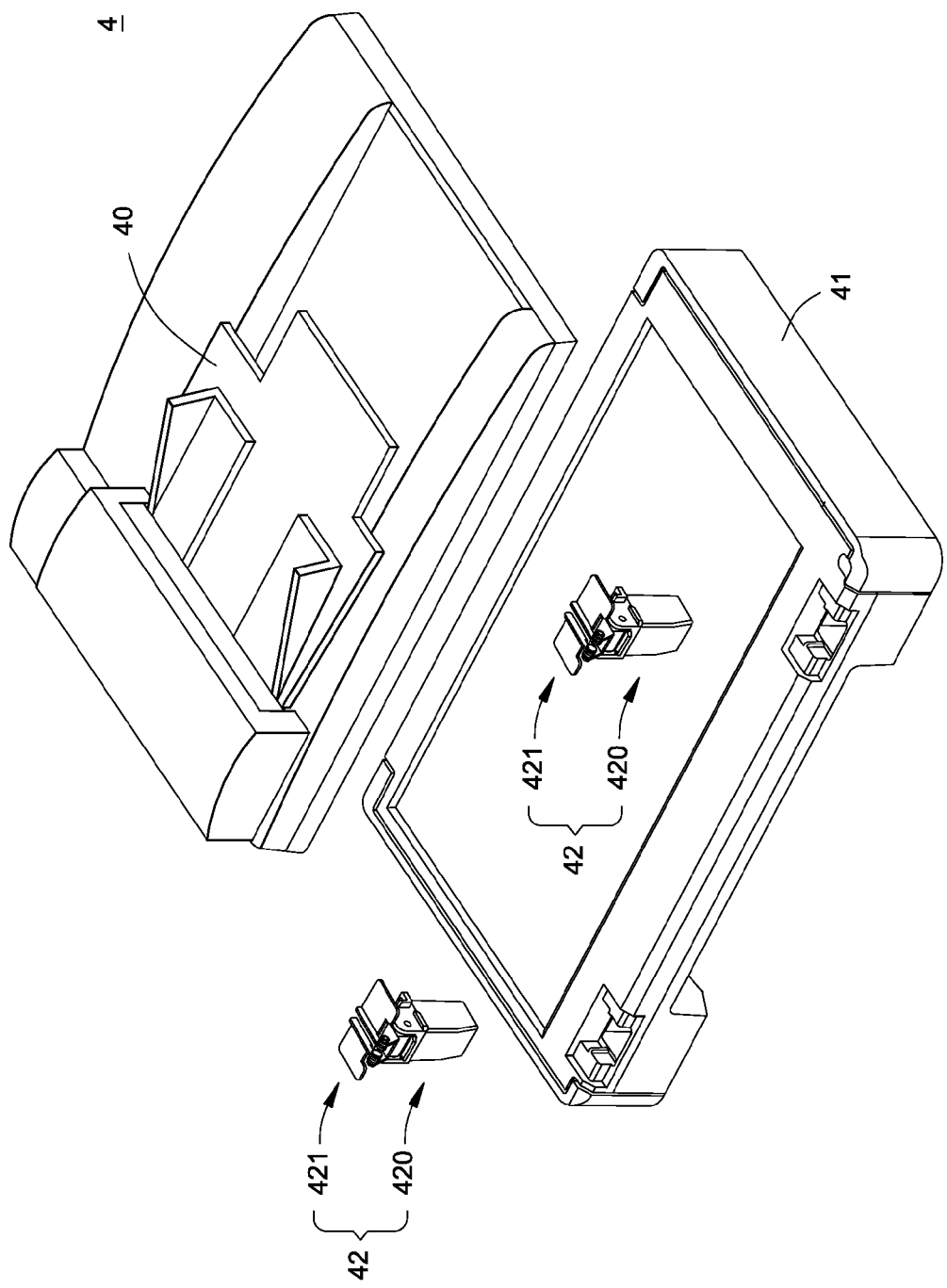
FIG. 3 is a detaching view of the auto document feeder.

FIG. 2 shows a first preferred embodiment of the scanner of the present invention having an auto document feeder. The scanner 4 includes an auto document feeder 40, a housing 41 having a scan flatbed thereon and a connecting mechanism 42. As shown in FIG. 3, the connecting mechanism 42 connects the housing 41 and the auto document feeder 40 to enable the feeder 40 to rotate with respect to the housing 42. The connecting mechanism 42 includes a first connecting device 420 and a second connecting device 421.

Please refer to FIG. 3, the first connecting device 420 is disposed on the housing 41 to rotate the auto document feeder 40 with respect to the housing 41 to a first angle S1, and the second connecting device 421 is disposed between the first connecting device 420 and the auto document feeder 40 to not only rotate the auto document feeder 40 with respect to the housing 41 within a second angle S2, but also stop the feeder 40 at any angular position within the angle S2.

Figure 4:
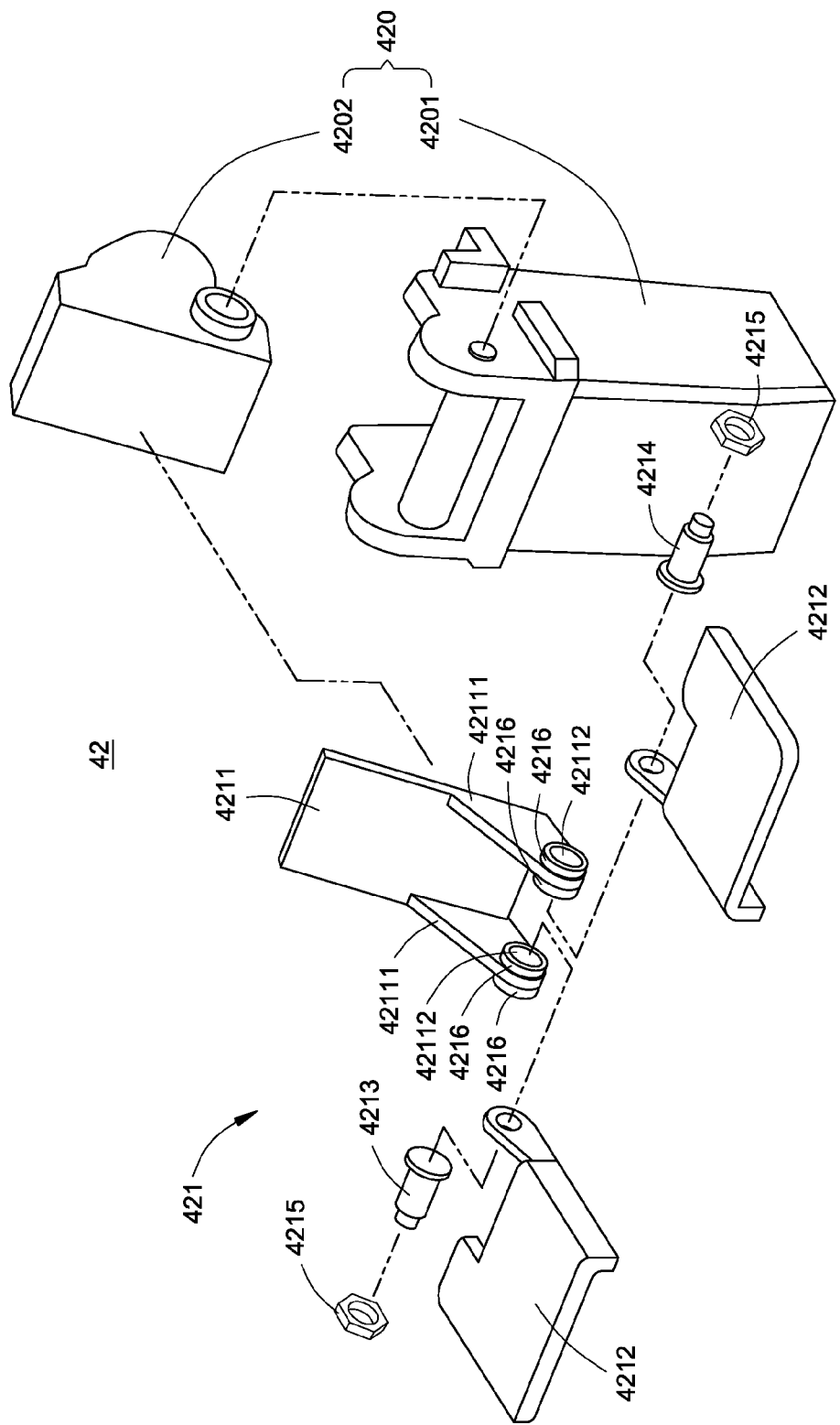
FIG. 4 is a detaching view of the connecting mechanism disclosed in FIG. 3.

Please refer to FIG. 4, the second connecting device 421 includes a first pivot piece 4211, two second pivot pieces 4212, a first axle 4213, a second axle 4214, two fixed elements 4215 and four metal wearing pieces 4216. The first pivot piece 4211 including two (pieces of) parallel wings 42111 is fixed to the first connecting device 420, and each wing 42111 having an axle hole 42112 thereon. The first axle 4213 and the second axle 4214 pass through these two axle holes 42112, respectively, and connect pivotally to one end of each one of these two second pivot pieces 4212, respectively, and the other end thereof are fixed to the auto document feeder 40. Two fixed elements 4215 are disposed on the outer sides of the first axle 4213 and the second axle 4214, respectively. The four metal wearing pieces 4216 are disposed between the fixed element 4215 and the wing 42111, and between the one side of the second pivot piece 4212 and the wing 42111, respectively. In addition, the first connecting device 420 includes a support portion 4201 and a rotation portion 4202, in which the support portion 4201 is connected to the housing 41, the rotation portion 4202 is pivotally connected to the support portion 4201, and the first pivot piece 4211 is fixed on the rotation portion 4202.

Figure 5A:
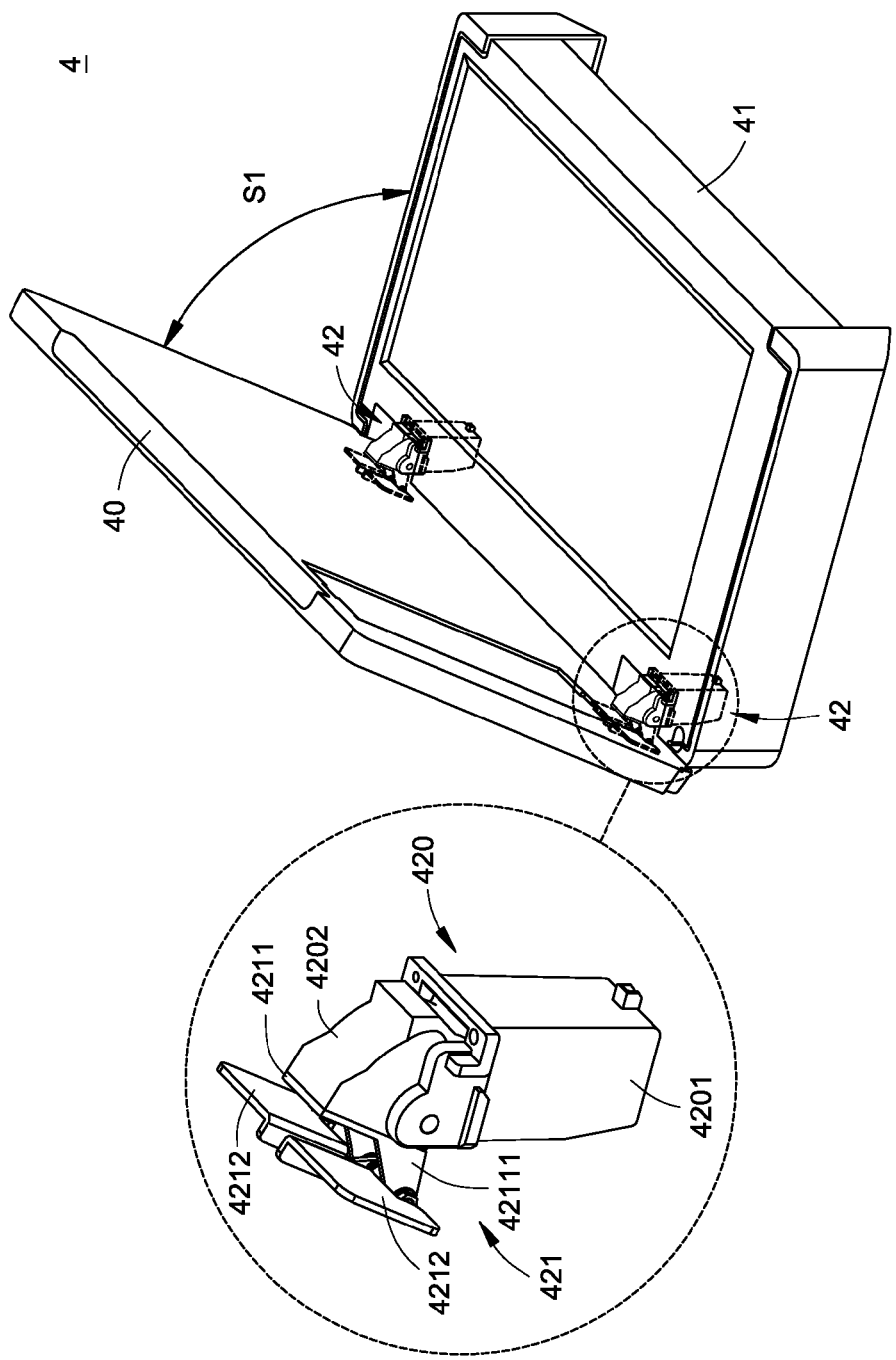
FIG. 5A is a perspective view showing the auto document feeder rotating to the first angle relative to the housing.
Figure 5B:
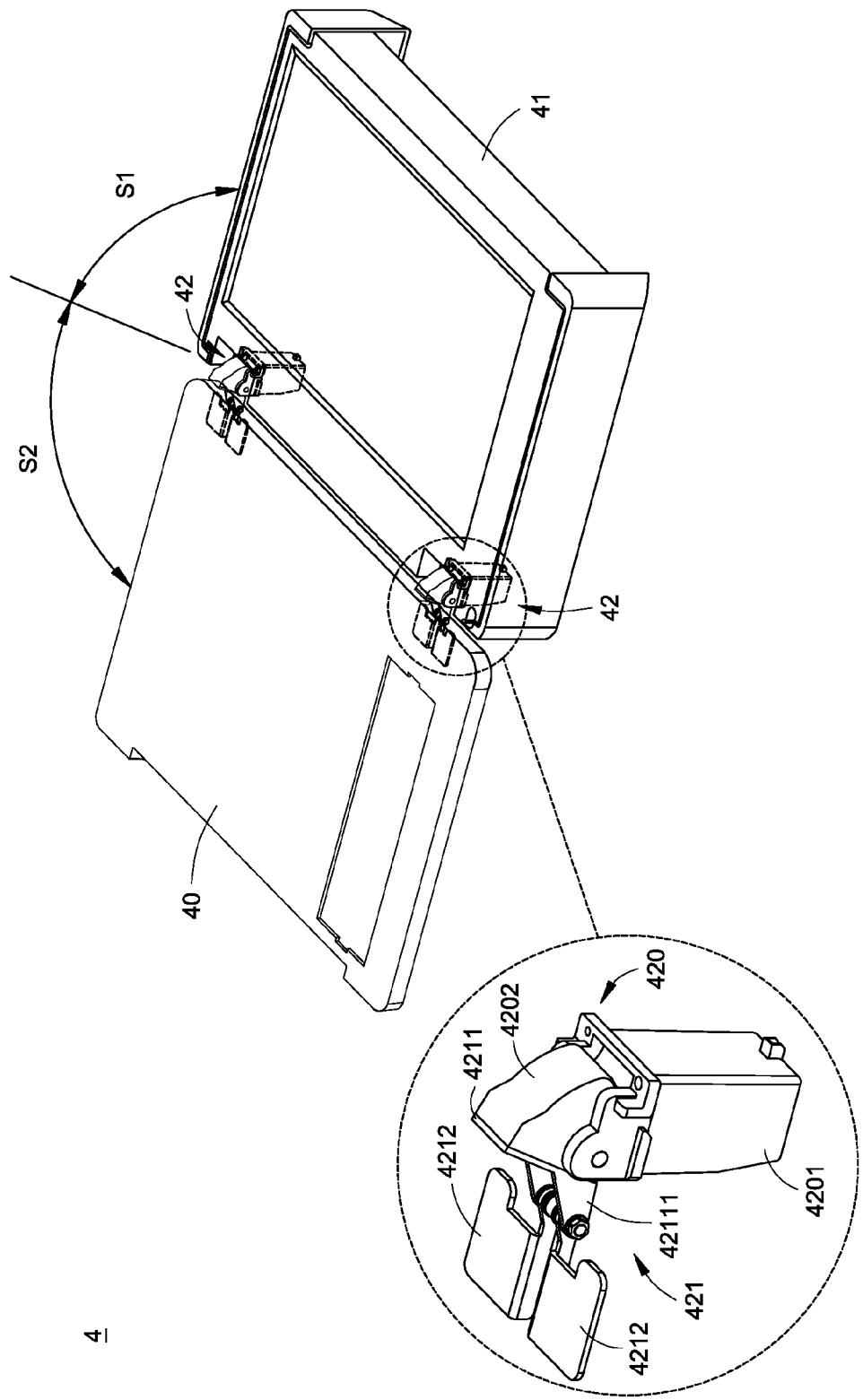
FIG. 5B shows the auto document feeder rotating to a largest angle relative to the housing.
Figure 5C:
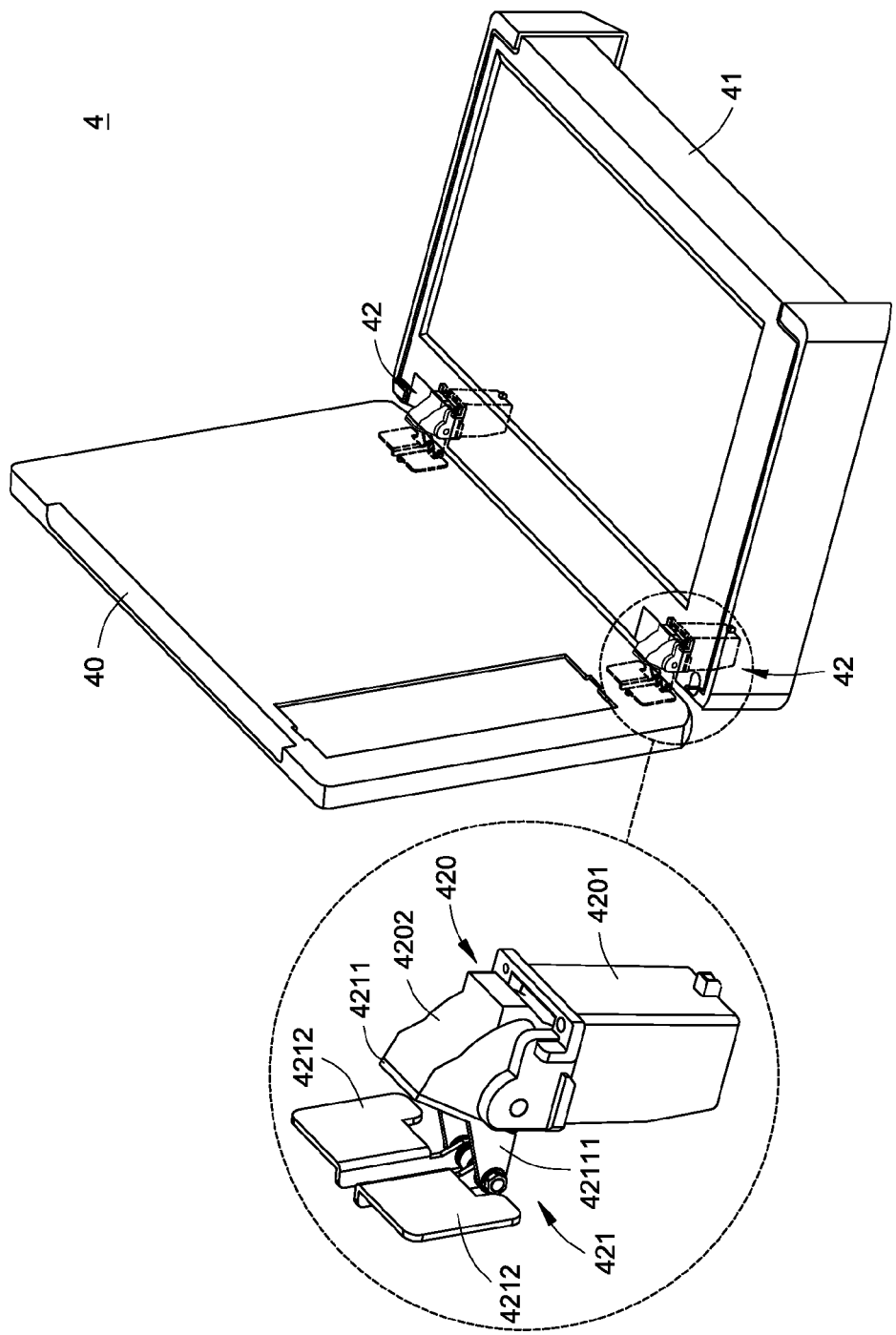
FIG. 5C shows the auto document feeder stopping at any angular position within the second angle.

The operation of the preferred embodiment shown in FIG. 2 is described as follow. Please concurrently refer to FIGS. 5A, 5B & 5C, when the auto document feeder 40 is opened, the first connecting device 420 supports the auto document feeder 40, and the rotation portion 4202 turns the auto document feeder 40 with respect to the housing 41 to a first angle S1, as shown in FIG. 5A; meanwhile, the first pivot piece 4211 is parallel to the second pivot piece 4212, and no relative rotation appeared therebetween. As to turn the auto document feeder 40 to a larger angle, the feeder 40 connected with the second pivot piece 4212 is able to rotate with respect to the first pivot piece 4211 within the second angle S2, as shown in FIG. 5B. When the largest angle is achieved, the auto document feeder 40 aligns with the housing 41 on a nominal horizontal plane. And when the auto document feeder 40 rotates with respect to the housing 41 within the second angle S2, the frictions between the metal wearing piece 4216 (Please refer to FIG. 4) and wing 42111, and between the fixed element 4215 (Please refer to FIG. 4) and the second pivot piece 4212, respectively, enable the second connecting device 421 to bear and stop the auto document feeder 40 at any angular position within the second angle S2, as shown in FIG. 5C.

Figure 6:
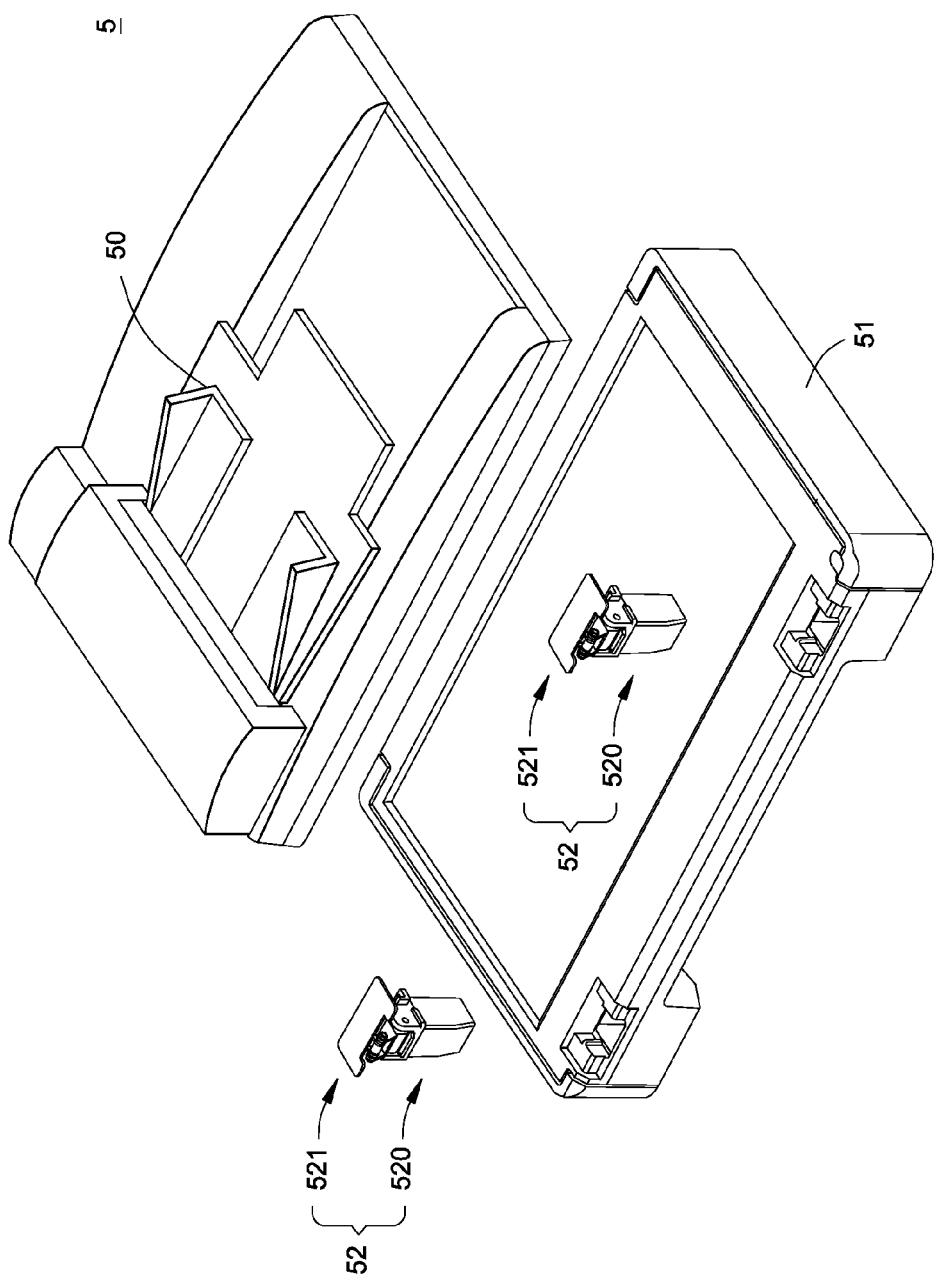
FIG. 6 is a detached view showing a second preferred embodiment of the scanner of the present invention with the auto document feeder, and there is no relative rotation between the feeder and the housing.

In addition, the present invention further provides a second preferred embodiment. Please refer to FIG. 6, which is a detached view showing a second preferred embodiment of the scanner of the present invention having an auto document feeder. The scanner 5 includes an auto document feeder 50 having an auto document feeding mechanism, a housing 51 and a connecting mechanism 52. The connecting mechanism 52 including a first connecting device 520 and a second connect device 521, is to connect the housing 51 to the auto document feeder 50 to rotate the auto document feeder 50 with respect to the housing 51. The first connecting device 520 is connected to the housing 51 to rotate the auto document feeder 50 with respect to the housing to a first angle S1, and the second connecting device 521 is disposed between the first connecting device 520 and the auto document feeder 50, to turn the auto document feeder 50 with respect to the housing and stop at any angular position within the second angle S2. And, the difference of the second preferred embodiment to the first one is the structure of second connecting device 521.

Figure 7:
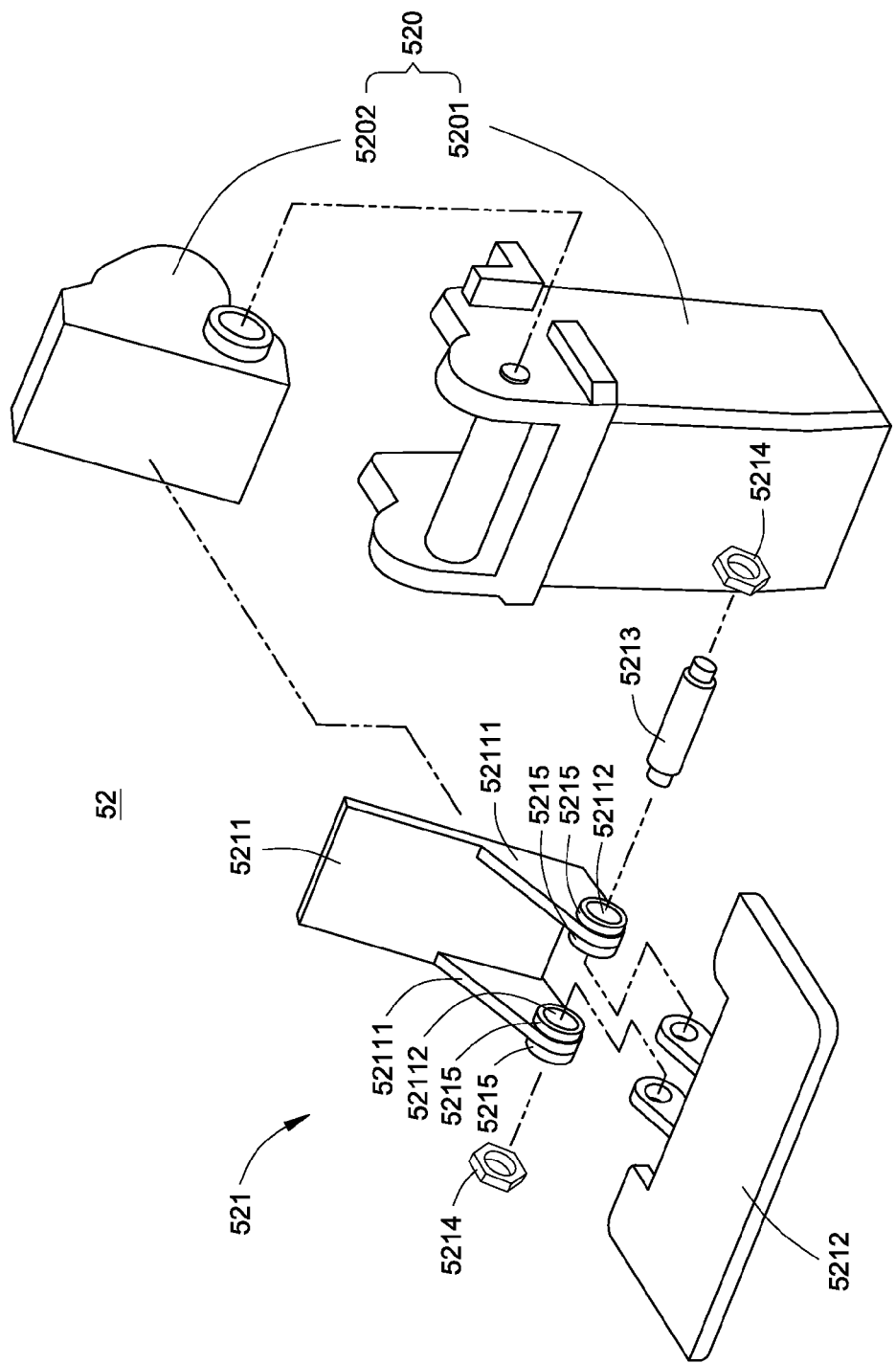
FIG. 7 is a detached view of the connecting mechanism disclosed in FIG. 6.

Please refer to FIG. 7, the second connecting mechanism 521 of the second preferred embodiment, including a first pivot piece 5211, a second pivot piece 5212, an axle 5213, two fixed elements 5214 and four metal wearing pieces 5215, in which the first pivot piece 5211 having thereon two parallel wing pieces 52111, is fixed on the first connecting mechanism 520. Each wing piece 52111 having thereon an axle hole 52112, the axle 5213 passes through these two axle holes 52112 on the two wing pieces 52111, respectively, and connects pivotally to one side of the second pivot piece 5212, the other side of the second pivot piece 5212 is fixed to the auto document feeder 50, the two fixed elements 5214 are disposed on the two ends of the axle 5213, respectively, and the four metal wearing pieces 5215 are disposed between the fixed element 5214 and the wing piece 52111, and between the one side of second pivot piece 5212 and the wind piece 52111. The major differences of the second connecting mechanism 521 of the second preferred embodiment to the second connecting mechanism 421 of the first preferred embodiment are the former just using one single second pivot piece 5212 and axle 5213. Please refer to the related descriptions for the first preferred embodiment to realize the structure and operation situation for the portions not been detail described for the scanner 5, and there is no more of reiteration hereinafter.

According to these two preferred embodiments mentioned, the present invention employs a second connecting mechanism to enable the auto document feeder to rotate with respect to the housing to a second angle, and the friction provided by the metal wearing piece is able to bear the auto document feeder to stop at any angular position within the second angle to meet user's requirement.

The present invention can prolong the service life of the axle. In addition, as the user is scanning a book or a bigger size document, the document feeder can meet the user's requirement to turn to any angular position to prevent from changing orientation for the scanned book or document, and room requirement for operation is also alleviated.

It should be noted that the above-mentioned embodiments illustrate rather than limit the invention, and that those skilled in the art will be able to design many alternative embodiments without departing from the scope of the appended claims.

What is claimed is:

1. A scanner with an auto document feeding mechanism, including:
   a housing including a scan flatbed thereupon;
   an auto document feeding mechanism for feeding document;
   a connecting mechanism connecting the housing with the auto document feeding mechanism to enable the auto document feeding mechanism to rotate with respect to the housing, the connecting mechanism including:
   a first connecting device connecting pivotally to the housing to enable the auto document feeding mechanism to rotate with respect to the housing to a first angle; and
   a second connecting device disposed between the first connecting device and the auto document feeding mechanism to enable the auto document feeding mechanism not only to rotate with respect to the housing to a second angle, but also stop at any angular position within the second angle, the second connecting device including:
   a first pivot piece fixed on the first connecting device;
   two parallel wing pieces disposed on the first pivot piece, in which, each of the wing pieces having thereon an axle hole;
   an axle passing through the two axle holes on the two parallel wing pieces;
   a second pivot piece with two ends, in which, one end is connected to the axle, and the other end is fixed on the auto document feeding mechanism;
   two fixed elements, disposed on the two ends of the axle, respectively; and
   four metal wearing pieces disposed between the fixed element and the wing piece, and between one end of the second pivot piece and the wing piece, respectively, to provide a friction to enable the auto document feeding mechanism to stop at any angular position within the second angle.

2. The scanner as claimed in claim 1, wherein the first connecting device includes:
   a supporting portion connecting to the housing, and
   a rotation portion connecting pivotally to the supporting portion; wherein the first pivot piece is fixed on the rotation portion.

3. The scanner as claimed in claim 1, wherein the two wing pieces are perpendicular to the first pivot piece.

4. The scanner as claimed in claim 1, wherein the first pivot piece and the second pivot piece are made of metal.

5. The scanner as claimed in claim 1, wherein the second angle is larger than the first angle, however less than 180 degrees.

* * * * *